United States Patent
Hou

(10) Patent No.: US 9,432,425 B2
(45) Date of Patent: Aug. 30, 2016

(54) METHOD AND SYSTEM FOR DOWNLOADING CONTENT

(75) Inventor: Zhirong Hou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 238 days.

(21) Appl. No.: 14/001,422

(22) PCT Filed: Dec. 5, 2011

(86) PCT No.: PCT/CN2011/083451
§ 371 (c)(1),
(2), (4) Date: Aug. 23, 2013

(87) PCT Pub. No.: WO2012/113253
PCT Pub. Date: Aug. 30, 2012

(65) Prior Publication Data
US 2013/0332585 A1     Dec. 12, 2013

(30) Foreign Application Priority Data
Feb. 25, 2011 (CN) .......................... 2011 1 0046497

(51) Int. Cl.
*G06F 15/16*     (2006.01)
*H04L 29/06*     (2006.01)
*H04W 88/18*     (2009.01)
*H04L 29/08*     (2006.01)
*H04L 12/58*     (2006.01)

(52) U.S. Cl.
CPC .......... *H04L 65/60* (2013.01); *H04L 63/1441* (2013.01); *H04L 63/1483* (2013.01); *H04L 67/02* (2013.01); *H04L 67/06* (2013.01); *H04L 67/28* (2013.01); *H04W 88/182* (2013.01); *H04L 12/585* (2013.01)

(58) Field of Classification Search
CPC .......... H04L 63/1483; H04L 63/1441; H04L 67/02; H04L 12/585; H04W 12/02
See application file for complete search history.

(56) References Cited

U.S. PATENT DOCUMENTS

| | | | |
|---|---|---|---|
| 7,725,452 B1* | 5/2010 | Randall | 707/709 |
| 2008/0168048 A1* | 7/2008 | Bell | G06F 17/30864 |
| 2009/0222430 A1 | 9/2009 | Hobson et al. | |
| 2009/0313261 A1* | 12/2009 | Corella | H04L 63/08 |
| 2012/0215839 A1* | 8/2012 | Doyle et al. | 709/203 |
| 2013/0117860 A1* | 5/2013 | Gnech | G06F 21/6218 726/28 |

FOREIGN PATENT DOCUMENTS

| | | |
|---|---|---|
| CN | 101309275 | 11/2008 |
| CN | 101754106 | 6/2010 |

(Continued)

*Primary Examiner* — Chirag R Patel
*Assistant Examiner* — Rachel J Hackenberg
(74) *Attorney, Agent, or Firm* — Pearl Cohen Zedek Latzer Baratz LLP

(57) ABSTRACT

The present document discloses a method and system for realizing content download, including: after a portal site receives a request for triggering download, generating a pseudo uniform resource locator (URL) for a content to be downloaded, establishing corresponding relationship information of the pseudo URL and a real URL of the content, and sending the pseudo URL of the content to a terminal which wants to download the content; the terminal which wants to download the content triggering the download to a download engine according to the pseudo URL; and the download engine inquiring the corresponding relationship information of the pseudo URL and the real URL of the content according to the pseudo URL, acquiring the real URL of the content, and downloading the content to the terminal which wants to download the content according to the acquired real URL.

7 Claims, 4 Drawing Sheets

(56) References Cited

FOREIGN PATENT DOCUMENTS

| CN | 101815061 | 8/2010 |
| CN | 102111750 | 6/2011 |
| JP | 2002-189973 | 7/2002 |
| JP | 2005-251190 | 9/2005 |
| JP | 2008-257422 | 10/2008 |
| WO | WO 2009/110622 | 9/2009 |

* cited by examiner

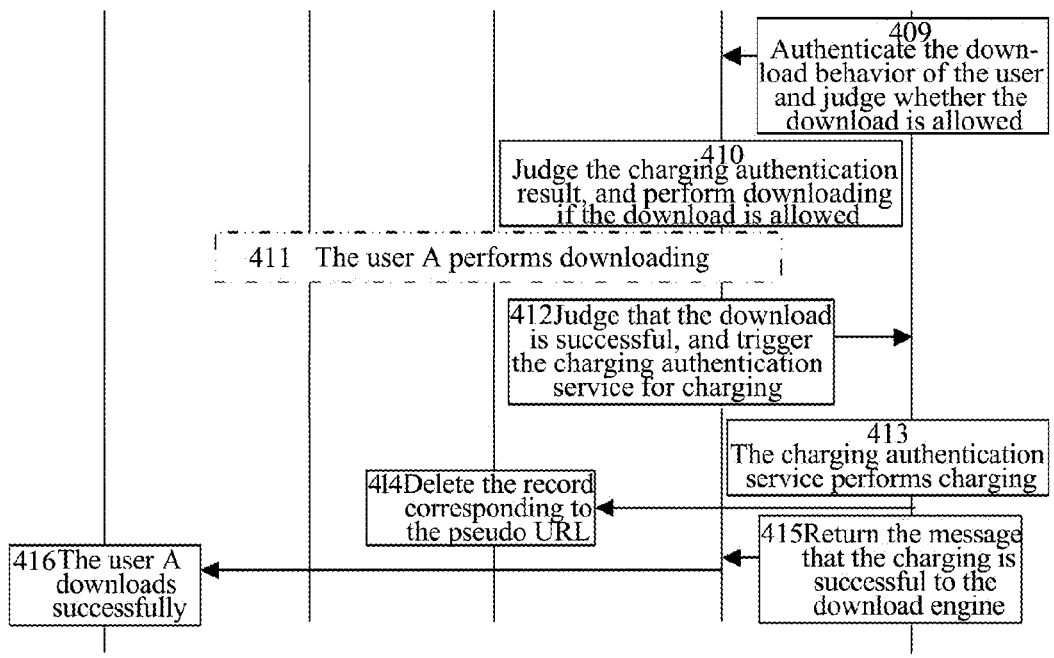
FIG. 4 (continue)

METHOD AND SYSTEM FOR DOWNLOADING CONTENT

CROSS-REFERENCE TO RELATED APPLICATIONS

This application is a National Phase Application of PCT International Application No. PCT/CN2011/083451, entitled "METHOD AND SYSTEM FOR DOWNLOADING CONTENT", International Filing Date Dec. 5, 2011, published on Aug. 30, 2012 as International Publication No. WO 2012/113253, which in turn claims priority from Chinese Patent Application No. 201110046497.7, filed Feb. 25, 2011, both of which are incorporated herein by reference in their entirety.

TECHNICAL FIELD

The present document relates to the field of the mobile internet technology, and in particular, to a method and system for realizing content download.

BACKGROUND OF THE RELATED ART

With flourishing development of the 3G (the third generation mobile communication technology) network, the mobile Internet has enters people's life deeply. The services, such as the mobile reading, the cartoon platform, the game platform and the downloading platform, etc., all provide various forms of downloading service functions for the user, for example, the user downloads the caricature from the cartoon platform to the mobile client for watching off line, and the user downloads the installation package from the game platform for installation. In order to promote flourishing development of the services, the operator also adopts various ways to promote the downloading consumption behavior of the user, for example, allowing the user to recommend download, to present download, to intelligently market short message download through an administrator WAP (wireless application protocol), and to perform video on demand (VOD) on the download through user short message, etc.

In the various forms of downloading ways above, what finally realizes the downloading function is the download engine. The general steps are: a recommending user sends the interlinkage which is directed to the download engine file to the recommended terminal user, or the presenting user sends the interlinkage which is directed to the download engine file to the presented terminal user, or the administrator user sends the interlinkage which is directed to the download engine file to the terminal user, and then the terminal user clicks the interlinkage for downloading. The user can perform recommending or presenting through the webpage (WEB), the WAP and the short message portal, etc., and the administrator can use the WAP PUSH short message for intelligent marketing through the administrator portal.

Now the interlinkage directed to the download engine is sent to the terminal user, while the real uniform resource locator (URL) is directly sent to the user, and this will bring the following problems:

(1). There is a flaw of the hotlinking. The URL interlinkage directed to the download engine carries the information of the downloading file, the information of the service provider (SP), the information of the content provider (CP) and the information of the distributor. If the download is presented or recommended, the URL also carries the information of the recommendation or presenting user, which will bring a very great hidden danger to the security of the system, and once the information is utilized maliciously by some illegal SP, CP manufacturers or persons, it will disturb the normal downloading function and cause losses to others.

(2). if the administrator performs the intelligent marketing through the WAP PUSH short message, or the terminal user recommends or presents the download, or performs VOD on the download through the WAP PUSH short message, because the URL interlinkage carries a large amount of information, the length is also very large, plus other contents, the length of the WAP PUSH short message may exceed the length of one piece of short message; and it is displayed on the user terminal as a long list of letters which perhaps are divided into a lot of rows, so the display effect is very bad, which is a fatal weakness of the mobile internet service which pays attention on the user experience.

SUMMARY OF THE INVENTION

The objective of the present document is to provide a method and system for realizing content download, which solves the problem of hotlinking and a lengthy interlinkage address in the content download.

In order to solve the above-mentioned technical problem, the present document provides a method for realizing content download, comprising:

after a portal site receives a request for triggering download, generating a pseudo uniform resource locator (URL) for a content to be downloaded, establishing corresponding relationship information of the pseudo URL and a real URL of the content, and sending the pseudo URL to a terminal which wants to download the content;

the terminal which wants to download the content triggering the download to a download engine according to the pseudo URL; and the download engine inquiring the corresponding relationship information of the pseudo URL and the real URL of the content according to the pseudo URL, acquiring the real URL of the content, and downloading the content to the terminal which wants to download the content according to the acquired real URL.

The pseudo URL contains an address of the download engine and an identification code of content related information.

In the step of triggering the download to a download engine, the terminal which wants to download the content triggers the download to the download engine according to the address of the download engine contained in the pseudo URL.

The real URL of the content contains the content related information; and the step of acquiring the real URL of the content and downloading the content to the terminal which wants to download the content according to the acquired real URL comprises: the download engine acquiring the real URL of the content according to the address of the download engine and the identification code of the content related information contained in the pseudo URL, and downloading the content to the terminal which wants to download the content according to the content related information in the acquired real URL.

The method further comprises:

before the step of the download engine downloading the content to the terminal which wants to download the content, sending the content related information to an authentication deduction entity, to request the authentication deduction entity to perform authentication on the download triggered by the terminal which wants to download the content; and the authentication deduction entity performing the authentication on the download triggered by the terminal which wants to download the content according to the content related information.

The method further comprises:

after the download engine successfully downloads the content to the terminal which wants to download the content, triggering the authentication deduction entity to perform deducting; and the authentication deduction entity performing charging and deducting operation, and deleting the corresponding relationship information of the pseudo URL and the real URL.

The method further comprises:

when the portal site establishes the corresponding relationship information of the pseudo URL and the URL of the content, recording a failure time of the pseudo URL; and if the download engine still does not download the content to the terminal which wants to download the content yet when the failure time is reached, then deleting a record corresponding to the pseudo URL.

The identification code of the content related information includes a timestamp, a network element number of a message source, and a random number.

The present document further provides a system for realizing content download, comprising a portal site and a download engine, wherein, the portal site is configured to, after receiving a request for triggering download, generate a pseudo uniform resource locator (URL) for a content to be downloaded, establish corresponding relationship information of the pseudo URL and a real URL of the content, and send the pseudo URL to a terminal which wants to download the content; and the download engine is configured to: after the terminal which wants to download the content triggers the download to the download engine according to the pseudo URL, inquire the corresponding relationship information of the pseudo URL and the real URL of the content according to the pseudo URL, acquire the real URL of the content, and download the content to the terminal which wants to download the content according to the acquired real URL.

The pseudo URL contains an address of the download engine and an identification code of content related information.

In summary, with the present document, the content related information is hidden and the occurrence of the problem of the hotlinking and the lengthy interlinkage address is avoided through generating the pseudo URL for the downloaded content. The method of the present document is convenient, flexible, economic and effective, which fully utilizes the resources of the current network, does not need to add new network element devices, and solves the problem of the hotlinking and the lengthy URL display in the scenarios, such as, presenting download, recommending download, an administrator marketing the download, and user short message VOD download, etc.

PREFERRED EMBODIMENTS OF THE INVENTION

In the present embodiment, a URL interlinkage sent to a terminal which wants to download a content is no longer a real URL, while it is a pseudo URL generated by a WEB portal, a WAP portal, a short message portal or an administrator portal. Each portal site records the information of the corresponding relationship between the pseudo URL and the real URL in the database at the same time. When there is a terminal which performs recommending, presenting, short message VOD or administrator intelligent marketing, the pseudo URL is sent to the terminal which wants to download the content; when the terminal which wants to download the content clicks the pseudo URL interlinkage, it is reoriented to the download engine; the download engine inquires about the corresponding relationship of the pseudo URL and the real URL from the database, acquires the real URL, and resolves the real URL, and triggers the charging service; and the charging service authenticates and charges the download behaviors of the user. Success message is returned to the download engine after the authentication or charging is finished, and is downloaded and processed by the download engine, which allows or refuses the user to download the file.

The present embodiment also discloses a download system, and the system includes: a portal site, a database, a download engine and an authentication deduction entity, wherein, the portal site includes a WEB portal, a WAP portal, a short message portal and an administrator portal, etc., which can generate the pseudo URL according to a certain rule; the database records the corresponding relationship information of the pseudo URL and the real URL; the download engine inquires the corresponding real URL according to the pseudo URL, resolves the real URL and triggers the authentication deduction entity; and the authentication deduction entity authenticates the download request of the terminal which wants to download the content; if the authentication is passed, then message is returned to the download engine, and then the download operation is performed by the download engine.

The method and system of the present embodiment are described in detail in combination with the accompanying drawings hereinafter.

Embodiment 1

Figure 1:
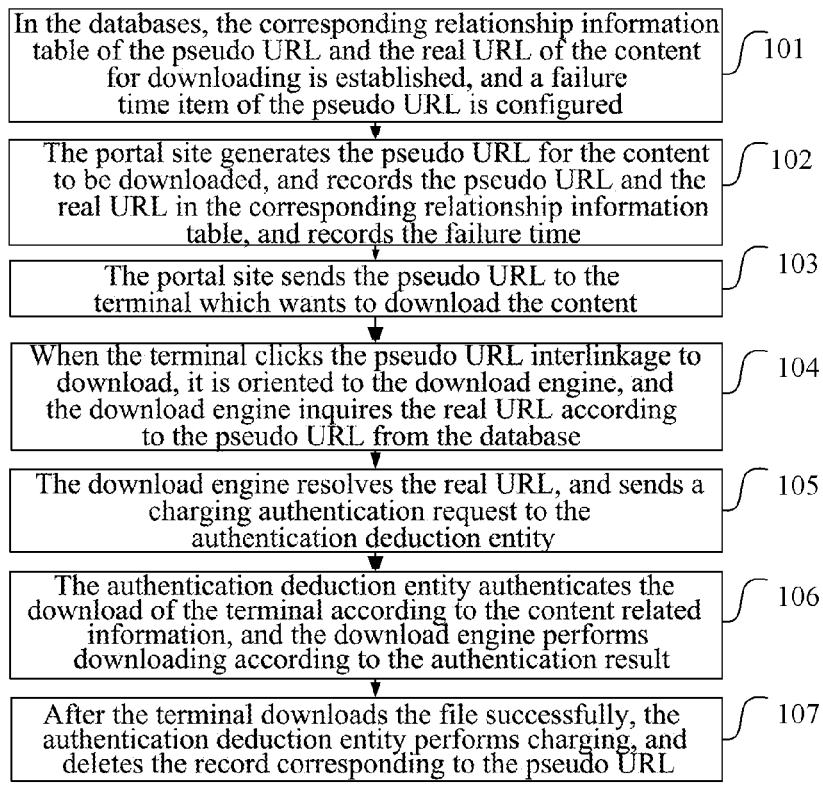
FIG. 1 is a flow chart of a method for realizing content download according to the embodiment of the present document.

FIG. 1 shows the method for realizing content download of the present embodiment, including the following steps:

In S101, in the database, the corresponding relationship information table of the pseudo URL and the real URL of the content for downloading (abbreviated as content) is established, and a failure time item of the pseudo URL is configured;

In S102, the portal site generates the pseudo URL for the content to be downloaded after receiving the request for triggering download, and records the pseudo URL and the corresponding real URL in the corresponding relationship information table in the database, and records the failure time of the pseudo URL at the same time;

as to different portals, the processing mode is described as follows:

a recommending user recommends the download content through the WEB portal or the WAP portal, etc., and the WEB portal or the WAP portal generates the pseudo URL and records the pseudo URL and the corresponding real URL into the corresponding relationship information table in the database, and records the failure time of the pseudo URL at the same time;

the recommending user also can present the download content through the WEB portal or the WAP portal, and the WEB portal or the WAP portal generates the pseudo URL and records the pseudo URL, the corresponding real URL and the failure time of the pseudo URL into the corresponding relationship information table in the database.

The terminal which wants to download the content can perform VOD on the download content through the short message portal; and the short message portal generates the pseudo URL, and records the pseudo URL, the corresponding real URL and the failure time of the pseudo URL into the corresponding relationship information table in the database.

When the administrator performs the short message marketing recommendation, the administrator portal generates the pseudo URL, and records the pseudo URL, the corresponding real URL and the failure time of the pseudo URL into the corresponding relationship information table in the database.

In S103, the portal site sends the pseudo URL to the terminal which wants to download the content;

the pseudo URL includes the address of the download engine and the identification code of the content related information.

In S104, when the terminal which wants to download the content clicks the pseudo URL interlinkage to perform the download operation, according to the pseudo URL interlinkage of the user recommendation, presenting and marketing short message, it is oriented to the download engine, and the download engine inquires the real URL according to the pseudo URL from the database;

the terminal which wants to download the content triggers the download to the download engine according to the address of the download engine included in the pseudo URL, to make the download engine acquire the pseudo URL of the content.

In S105, the download engine resolves the real URL, and sends the real URL to the authentication deduction entity through the charging authentication interface, to initiate a charging authentication request to the authentication deduction entity;

the real URL includes content related information, and the content related information includes: an address of the content and information of the content+information of the CP+information of the SP+a sign of the recommendation operation+a user ID of a user A+a user ID of a user B, etc.

In S106, the authentication deduction entity authenticates the download of the terminal which wants to download the content according to the content related information, and returns the authentication result to the download engine, and the download engine performs downloading according to the authentication result;

In S107, after the terminal downloads the file successfully, the download engine triggers the authentication deduction entity, and the authentication deduction entity performs charging, and deletes the record corresponding to the pseudo URL;

after exceeding the failure time of the pseudo URL, the record corresponding to the above-mentioned pseudo URL is deleted by a specialized task.

Preferably, in order to guarantee that the failed pseudo URL in the database is deleted in time, the field for recording the failure time is added into the database table structure, and the database table structure can be designed as follows:

| Field one | Field two | Field three |
|---|---|---|
| Pseudo URL | Real URL | Failure time |

After the download engine judges that the user performs the download successfully by using the pseudo URL, the download engine triggers the authentication deduction entity, and the authentication deduction entity deletes the corresponding record in the database while charging; or if there is no download after the failure time is exceeded, then that record is deleted by a task.

In the step S102, supposing that the user A recommends the download content to the user B, in order to identify the content recommended by the recommending user, and to calculate the accumulative total amount of the download of the SP and the CP, and at the same time, in order to guarantee that only the user accepting the recommendation can download the content, etc., the portal site needs to send the address of the download engine+the content related information to the download engine, and the download engine sends the above-mentioned information to the authentication deduction entity or other charging network elements, to complete the authentication and charging operation etc. The content related information includes: the address of the content, the information of the content+the information of the SP+the information of the CP+the sign of the recommendation operation+the user ID of the user A+the user ID of the user B, etc., wherein, the user B is a user accepting that recommendation, that is, the user who wants to download the content. Because the information of the user who wants to download the content is included, after the message is forwarded, if the corresponding relationship of the presenting user and the accepting user is wrong when the authentication deduction entity performs the authentication, the download behavior will be refused.

In the present embodiment, the content related information required to be hidden, such as, the address of the content, the information of the content, the information of the SP, the information of the CP, the sign of the recommendation operation, the user ID of the user A and the user ID of the user B, etc., is replaced by a character string, and the character string can be called as the identification code of the content related information; the identification code of the content related information is connected after the address of the download engine, to form the pseudo URL of the download operation of the user.

Further, the above-mentioned identification code of the content related information can be generated by various ways, but it must be guaranteed that the character string corresponding to each download behavior must be unique. Preferably, the way of a timestamp+a network element number of the message source+a random number can be adopted. Wherein, the timestamp can be accurate to second. The network element number of the message source means the numbers of the WEB portal, the WAP portal, the short message portal and the administrator portal, etc. For example, the number of the WEB portal is 001 the number of the WAP portal is 002, the number of the short message portal is 003, and the number of the administrator portal is 004.

When the user performs recommending, presenting, short message VOD, and administrator marketing, the ways for sending the interlinkage to the terminal user include:

private message, suitable for recommending operation and presenting operation and intelligent marketing of the administrator of the WEB and the WAP portal;

mail sending, suitable for recommending, presenting and intelligent marketing of the administrator of the WEB and the WAP portal;

PUSH short message sending, suitable for recommending, presenting, intelligent marketing of the administrator of the WEB and the WAP portal, and VOD operation of the user short message portal.

Embodiment 2

Figure 2:
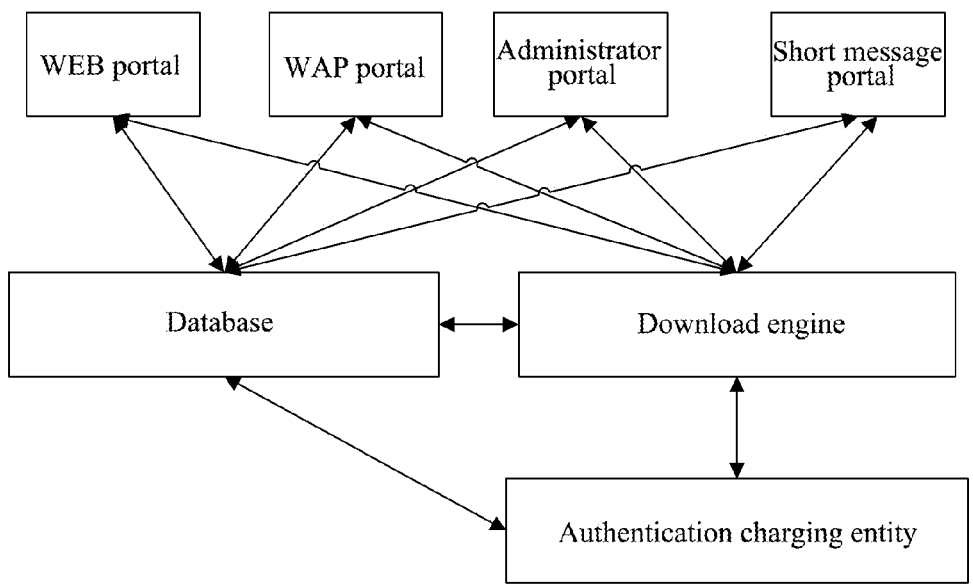
FIG. 2 is a framework diagram of a system for realizing content download according to the embodiment of the present document.

As shown in FIG. 2, the system of the present embodiment includes: a portal site, a database, a download engine and a charging authentication entity, wherein, the portal site includes a WEB portal, a WAP portal, a short message portal and an administrator portal, etc.

The WEB portal provides an operation interface and a function for the user to access the system by using a PC, and the user can performs the operations, such as recommending, presenting, etc. for other users through private message, mail and push short message, etc. on the WEB portal. When the user performs recommending and presenting, the WEB portal generates the pseudo URL, and records it into the database.

The WAP portal provides an operation interface and a function for the user to access the system by using a mobile terminal, and the user can performs the operations, such as recommending, presenting, etc. for other users through the private message, the mail and the push short message, etc. on the WAP portal. When the user performs recommending and presenting, the WAP portal generates the pseudo URL, and records it into the database.

For the short message portal, the user can send a specific character string to the access code of the short message portal, to access the short message portal, thus realizing the short message VOD function. For example, the user edits the download game 1 to send to the access code 12345678. After the short message portal receives the message, it returns the push short message interlinkage including the pseudo URL to the user, and records the corresponding relationship of the pseudo URL and the real URL into the database. When the user clicks the interlinkage, the game 1 is downloaded.

For the administrator portal: in the present embodiment, the administrator performs the intelligent marketing through the administrator portal, and the administrator edits the private message, mail, and push short message, etc., including the pseudo URL through the administrator portal to send to the terminal which wants to download the content, and records the corresponding relationship of the URL and the real URL into the database. The terminal user realizes the download function through clicking the pseudo URL.

For the database, essential information, account information and consumption record of the user, the corresponding relationship information of the real URL of the content and the pseudo URL, etc are recorded into the database.

The download engine realizes the functions, such as, inquiring the corresponding relationship of the real URL and the pseudo URL, resolving the real URL, triggering the charging authentication service, the user download management, etc.

The charging authentication entity realizes the authentication and charging function of the user download behavior, and deletes the corresponding relationship of the real URL and the pseudo URL which is downloaded successfully.

Embodiment 3

Figure 3:
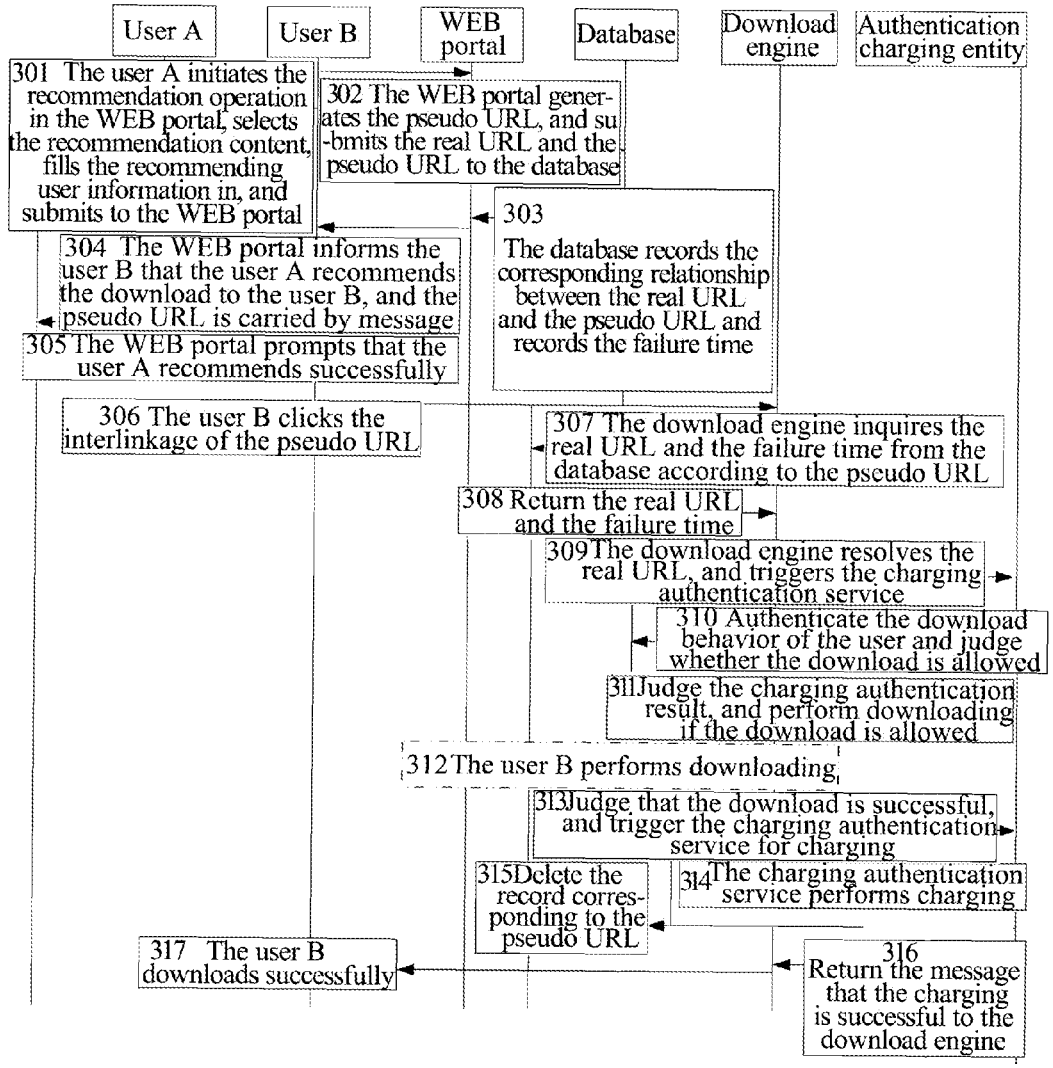
FIG. 3 is a flow chart of recommending download content according to the embodiment of the present document.

As shown in FIG. 3, taking the procedure of the user A recommending the download content to the user B through the WEB portal as an example, the method of realizing the content download of the present embodiment is illustrated, including the following steps:

In S301, the user A initiates the recommendation operation in the WEB portal, selects the recommendation content, fills the recommending user information in, and submits to the WEB portal;

In S302, the WEB portal generates the pseudo URL of the recommendation content, and submits the real URL and the pseudo URL to the database;

In S303, the database records the corresponding relationship information of the real URL and the pseudo URL and records the failure time, and returns record success message to the WEB portal;

In S304, the WEB portal informs the user B that the user A recommends the download content to the user B, and the pseudo URL is carried by message;

In S305, the WEB portal prompts that the user A recommends successfully;

In S306, the user B clicks the interlinkage of the pseudo URL to perform the download operation after seeing the content recommended by the user A;

In S307, the download engine inquires the real URL and the failure time from the database according to the pseudo URL after receiving the download request;

In S308, the database returns the real URL and the failure time;

In S309, the download engine resolves the real URL, and sends the real URL to the authentication charging entity through the interface with the authentication charging entity to trigger the charging authentication;

In S310, the authentication charging entity performs the authentication on the download behavior according to the real URL, judges whether the download is allowed, and sends the authentication result to the download engine;

In S311, the download engine judges the authentication result, and performs downloading if the download is allowed;

In S312, the user B performs downloading;

In S313, the download engine judges whether the download operation is successful; if yes, then the authentication charging entity is triggered again, and the charging is confirmed;

In S314, the authentication charging entity performs charging and deduction operation on request, and informs the database to delete the record corresponding to the pseudo URL;

In S315, the database deletes the record corresponding to the pseudo URL;

In S316, the charging authentication service returns the message that the charging is successful to the download engine;

In S317, the download engine prompts that the user downloads successfully.

The hiding of the key information in the download interlinkage is realized through the above-mentioned steps, and the hotlinking is prevented. And the lengthy content of the push short message is simplified, which realized the good experience of the user.

Embodiment 4

Figure 4:
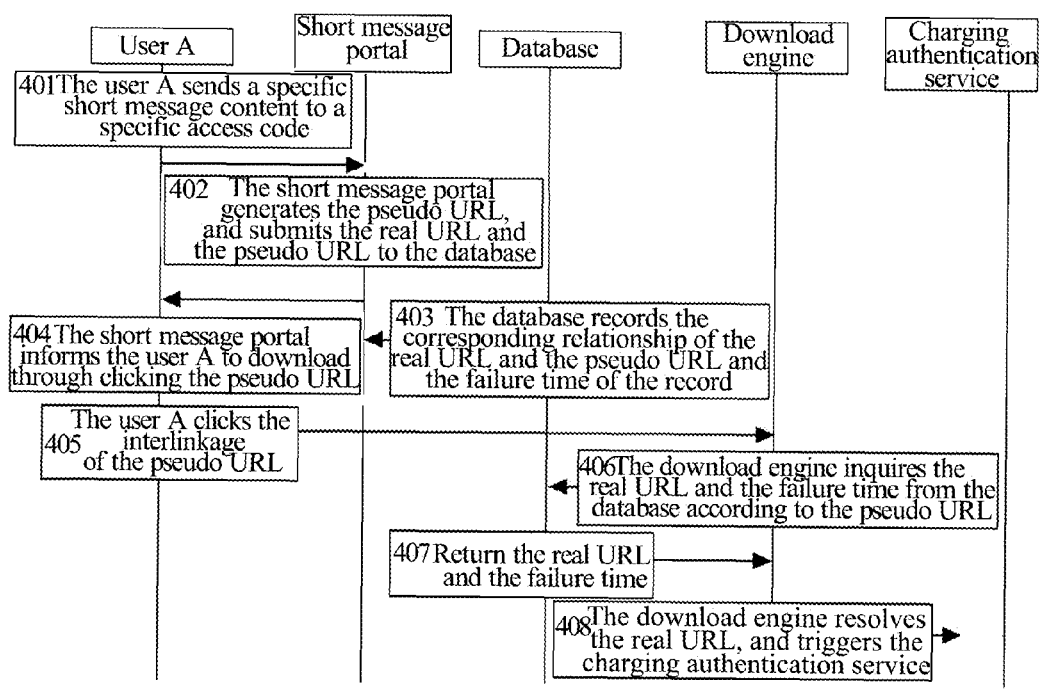
FIG. 4 is a flow chart of performing VOD on download content according to the embodiment of the present document.

As shown in FIG. 4, taking the procedure of the user A performing VOD on the download by way of the short message VOD as an example, the method of realizing the content download of the present embodiment is illustrated, including the following steps:

In S401, the user A sends a specific short message content to a specific access code, and the short message of the user is forwarded to the short message portal;

In S402, the short message portal generates the pseudo URL, and submits the real URL and the pseudo URL to the database;

In S403, the database records the corresponding relationship information of the real URL and the pseudo URL and the failure time, and returns record success message to the short message portal;

In S404, the short message portal informs the user A to perform the download operation through clicking the pseudo URL;

In S405, the user A clicks the interlinkage of the pseudo URL to initiate the download operation request;

In S406, after the download engine receives the download request, the download engine inquires the real URL and the failure time from the database according to the pseudo URL;

In S407, the database returns the real URL and the failure time;

In S408, the download engine resolves the real URL, and sends the real URL to the authentication charging entity through the interface with the authentication charging entity to trigger the charging authentication;

In S409, the authentication charging entity performs the authentication on the download behavior according to the real URL, judges whether the download is allowed, and sends the authentication result to the download engine;

In S410, the download engine judges the charging authentication result, and performs the download processing if the download is allowed;

In S411, the user A performs the download processing;

In S412, the download engine judges whether the download operation is successful; if yes, the authentication charging entity is triggered again, and the charging is confirmed;

In S413, the authentication charging entity performs the charging and deduction operation on request, and informs the database to delete the record corresponding to the pseudo URL;

In S414, the database deletes the record corresponding to the pseudo URL;

In S415, the charging authentication service returns the message that the charging is successful to the download engine;

In S416, the download engine prompts that the user downloads successfully.

The hiding of the key information in the download interlinkage is realized through the above-mentioned steps, and the hotlinking is prevented. And the lengthy content of the push short message is simplified, which realized the good experience of the user.

According to the above-mentioned methods and steps, the problems of the hotlinking of the download interlinkage and the lengthy push short message during recommending, presenting, short message VOD and administrator intelligent marketing processes can be solved very conveniently. The realization method of the service is convenient, flexible, economic and effective, which fully utilizes the resources of the current network, does not need to add new network element devices, protects the legitimate interests of the roles in the mobile internet download services, such as operator, user, SP and CP, etc., promotes the user experience, and has very high economic value and technical value.

Obviously, it can be understood by those skilled in the art that each module or each step above-mentioned in the present document can be implemented by the universal calculating apparatus, and they can be integrated in a single calculating apparatus, or distributed in the network composed of a plurality of calculating apparatus. Alternatively, they can be implemented by the executable program codes of the calculating apparatus. Accordingly, they can be stored in the storage apparatus and implemented by the calculating apparatus, or they are manufactured into individual integrated circuit modules respectively, or a plurality of modules or steps therein are made into the single integrated circuit module to be implemented. In this way, the present document is not limit to any specific form of the combination of the hardware and software.

The above description is only the preferred embodiments of the present document and is not intended to limit the present document. For those skilled in the art, the present document can have various modifications and variations. All of modifications, equivalents and/or variations without departing from the spirit and essence of the present document should be embodied in the scope of the appended claims of the present document.

INDUSTRIAL APPLICABILITY

Compared with the related art, in the present document, through generating the pseudo URL for the download content, the content related information is hidden, the occurrence of the problem of the hotlinking and the lengthy interlinkage address is avoided, and at the same time the problems of the hotlinking and the lengthy URL display in the scenarios, such as, presenting download, recommending download, administrator marketing download and perform VOD on the downloading through the user short message, etc are solved.

What we claim is:

1. A method for realizing content download, comprising:
   after a portal site receives a request for triggering download, generating a pseudo uniform resource locator (URL) for a content to be downloaded, establishing corresponding relationship information of the pseudo URL and a real URL of the content, and sending the pseudo URL to a terminal which wants to download the content;
   the terminal which wants to download the content triggering the download to a download engine according to the pseudo URL; and
   the download engine inquiring the corresponding relationship information of the pseudo URL and the real URL of the content according to the pseudo URL, acquiring the real URL of the content, and downloading the content to the terminal which wants to download the content according to the acquired real URL;
   wherein, the pseudo URL contains an address of the download engine and an identification code of content related information of the real URL so as to hide the content related information of the real URL; and
   wherein, the identification code of the content related information contains a timestamp, a network element number of a message source and a random number to guarantee that the identification code corresponding to each download behavior is unique.

2. The method according to claim 1, wherein,
   in the step of triggering the download to a download engine, the terminal which wants to download the content triggers the download to the download engine according to the address of the download engine contained in the pseudo URL.

3. The method according to claim 1, wherein,
   the real URL of the content contains the content related information; and the step of acquiring the real URL of the content and downloading the content to the terminal which wants to download the content according to the acquired real URL comprises: the download engine acquiring the real URL of the content according to the address of the download engine and the identification code of the content related information contained in the pseudo URL, and downloading the content to the terminal which wants to download the content according to the content related information in the acquired real URL.

4. The method according to claim 3, further comprising:
before the download engine downloads the content to the terminal which wants to download the content, sending the content related information to an authentication deduction entity to request the authentication deduction entity to authenticate the download triggered by the terminal which wants to download the content; and
the authentication deduction entity authenticating the download triggered by the terminal which wants to download the content according to the content related information.

5. The method according to claim 4, further comprising:
after the download engine successfully downloads the content to the terminal which wants to download the content, triggering the authentication deduction entity to deduct; and
the authentication deduction entity performing charging and deducting operation, and deleting the corresponding relationship information of the pseudo URL and the real URL.

6. The method according to claim 1, further comprising:
when the portal site establishes the corresponding relationship information of the pseudo URL and the URL of the content, recording a failure time of the pseudo URL; and
if the download engine still does not download the content to the terminal which wants to download the content yet when the failure time is reached, then deleting a record corresponding to the pseudo URL.

7. A system for realizing content download, comprising a portal site and a download engine, wherein,
the portal site is configured to, after receiving a request for triggering download, generate a pseudo uniform resource locator (URL) for a content to be downloaded, establish corresponding relationship information of the pseudo URL and a real URL of the content, and send the pseudo URL to a terminal which wants to download the content; and
the download engine is configured to: after the terminal which wants to download the content triggers the download to the download engine according to the pseudo URL, inquire the corresponding relationship information of the pseudo URL and the real URL of the content according to the pseudo URL, acquire the real URL of the content, and download the content to the terminal which wants to download the content according to the acquired real URL;
wherein, the pseudo URL contains an address of the download engine and an identification code of content related information of the real URL so as to hide the content related information of the real URL; and
wherein, the identification code of the content related information contains a timestamp, a network element number of a message source and a random number to guarantee that the identification code corresponding to each download behavior is unique.

* * * * *